Figure 1:
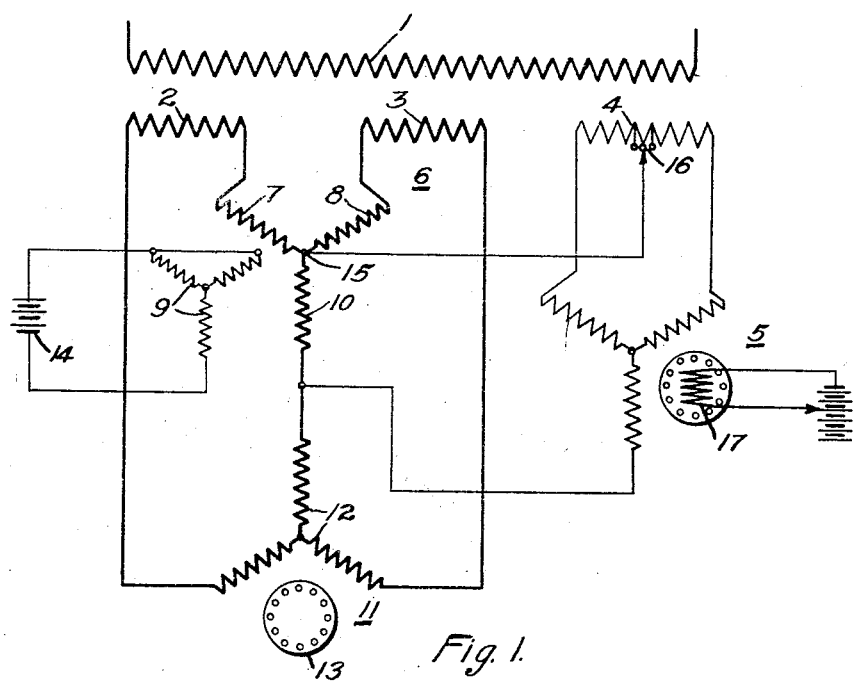

Nov. 11, 1924.  
R. E. HELLMUND  
1,515,200  
BALANCED PHASE CONVERTER WITH POWER FACTOR CORRECTION  
Filed Jan. 6, 1921

WITNESSES:  
R. L. Jeffrey  
O. B. Buchanan

INVENTOR  
Rudolf E. Hellmund.  
BY  
Wesley G. Carr  
ATTORNEY

Patented Nov. 11, 1924.

1,515,200

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

BALANCED PHASE CONVERTER WITH POWER-FACTOR CORRECTION.

Application filed January 6, 1921. Serial No. 435,345.

*To all whom it may concern:*

Be it known that I, RUDOLF E. HELLMUND, a citizen of the United States, and a resident of Swissvale, in the county of Allegheny and State of Pennsylvania, have invented a new and useful Improvement in Balanced Phase Converters with Power-Factor Corrections, of which the following is a specification.

My invention relates to phase converters and while it comprises certain improvments which are applicable to any phase converter, said improvements permitting wattless currents to be supplied to the line without unbalancing the converter, it is particularly applicable to the well-balanced phase-converter means for supplying locomotive loads, disclosed in Patent No. 1,480,666 to L. W. Chubb, assigned to the Westinghouse Electric & Manufacturing Company.

The phase converter described in the above-mentioned application comprises a transformer supplying single-phase electromotive forces and an induction-type phase converter connected thereto in such manner that the single-phase electromotive forces of the transformer combine with the terminal electromotive forces of the phase converter to produce resultant electromotive forces having a phase sequence opposite to the phase sequence of the converter electromotive forces. In this manner, the resultant polyphase electromotive forces are caused to have the same phase sequence as the impedance drops in the phase converter, so that the resultant voltages are not unbalanced by the impedance drops.

With balanced phase-converter systems of the above type, it is difficult to obtain proper power-factor compensation without disturbing the phase balance. In order to accomplish better results, it has been proposed to introduce either auxiliary phase converters or synchronous condensers connected across the polyphase lines. In either of these cases, however, the auxiliary machines furnish wattless current to the transformer, and a part of the wattless current is then supplied by the transformer to auxiliary apparatus, such as blower motors, usually required on locomotives.

According to my invention, I obviate the indirect supply of wattless current to the auxiliary motors and thus secure a reduction in the size and weight of the apparatus required.

The difficulty with a balanced phase converter is that the balance of the currents is naturally impossible if two of the primary phases furnish wattless current to the transformer while the third phase does not furnish this current.

The object of my invention is, therefore, to facilitate the balance by making the third phase furnish wattless current to the auxiliary motors or similar apparatus on the locomotive.

Further objects and details of my invention will be understood from the following specification when read in the light of the accompanying drawings.

Figure 2:
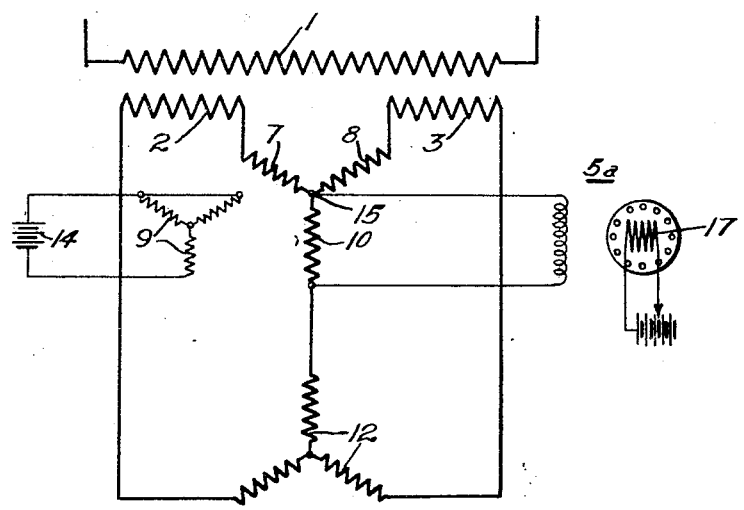

Figure 1 is a diagrammatic view of a phase converter, together with its associated apparatus, embodying a preferred form of my invention, and Fig. 2 is a similar view illustrating a modification.

In the embodiment shown in Fig. 1, I provide a transformer 1 having three separate windings 2, 3, and 4, the latter of which is employed in connection with an auxiliary motor 5. The phase converter 6 has primary windings 7 and 8, secondary windings 9 and a tertiary or auxiliary primary winding 10. A main motor 11, having a primary winding 12 and a secondary winding 13, is driven by the phase converter, the transformer windings 2 and 3 being connected, respectively, in series with primary converter windings 7 and 8, as described in the aforesaid Chubb patent.

The secondary windings 9 of the converter are provided with any unidirectional exciting means, as indicated by the battery 14, whereby the primary windings 7 and 8 may supply wattless currents to the single-phase line.

The star point 15 of the converter is connected to an intermediate tap 16 of the transformer coil 4, so that the auxiliary primary converter winding 10 and transformer coil 4 form a T connection. The auxiliary motor 5 is connected to the polyphase terminals of said T connection, the number of turns in the coil 4 being adjusted so that the power components of the currents drawn by the motor 5 are supplied mainly from the transformer winding 4, while the wattless components are supplied by the auxiliary primary winding 10. The motor 5 is provided with a direct-current exciting winding, as indicated at 17. The amount of wattless current drawn by the motor 5 may be varied at will by adjusting the direct-current excitation.

With the above described arrangement, it is possible to change the adjustment of the two direct-current excitations, or to change the number of turns in the transformer secondary windings, with changes in the load drawn by the main motor 11, in such manner that the auxiliary primary winding 10 will always supply the same amount of wattless current as the primary windings 7 and 8. However, good results may be obtained, in practice, by making the adjustment for average conditions and leaving the transformer taps unchanged during operation. Some adjustment may be easily obtained, in practice, by slightly adjusting the direct-current excitation of the auxiliary motor 5.

Whenever the mechanical load of the auxiliary machine is relatively small, it is not necessary to use all of the refinements of Fig. 1. For example, the auxiliary motor 5a may be operated simply as a single-phase motor from the auxiliary primary converter winding 10, as indicated in Fig. 2, the power required by the motor 5a being insufficient to materially unbalance the polyphase system.

While I have illustrated my invention in its preferred forms, it is to be understood that it is susceptible of various modifications by those skilled in the art, and that the claims are to be construed to cover all equivalents and modifications, except where limitations are expressly stated or are imposed by the prior art.

I claim as my invention:—

1. The combination with a pair of alternating-current systems of different phase-numbers, of a series synchronous dynamo-electric machine having its primary phase windings serially interconnecting said systems for interchange of power, said synchronous machine having less than all of its primary windings connected to said alternating-current system having the smaller phase-number, and auxiliary apparatus deriving wattless current from the remaining interconnected primary windings.

2. In a system of distribution, the combination with a source of single-phase electromotive forces, of a polyphase translating device, and polyphase connections from certain terminals of said polyphase translating device to said source of single-phase electromotive forces in series with certain phase windings of said converter, and other connections from the remaining polyphase terminals to the remaining phase-converter windings, said single-phase connections being so arranged that said single-phase electromotive forces produce the result of reversing the phase sequence of the output electromotive forces of said phase converter without reversing the phase sequence of the impedance drops therein, means for causing said first mentioned phase windings of said converter to deliver wattless current to said single-phase system, and auxiliary apparatus deriving wattless current from said remaining converter phase windings.

3. The combination with a phase-converter system, of a main motor to be operated in series with the phase converter, auxiliary apparatus deriving wattless current from less than all of the phase-converter windings, and means whereby substantially no unbalanced power components of current are drawn by said auxiliary apparatus from said phase converter.

4. An electrical system comprising a substantially balanced polyphase translating device, a dynamo-electric machine having a polyphase primary winding and a secondary winding, an unbalanced translating device having a plurality of terminals, conductors connecting said translating devices and said machine in series, whereby a portion of said unbalanced translating device is included in each complete circuit between said balanced device and said machine, said secondary winding rotating in such direction that the terminal electromotive forces generated in said machine have a phase-sequence opposite to that of said balanced device, the excitation of said series machine being such that unbalanced wattless currents are delivered thereby to the balanced device, and auxiliary apparatus for drawing single-phase reactive currents from said system for compensating for the unbalance in the wattless currents delivered to said balanced device.

5. An electrical system comprising a substantially balanced polyphase translating device, a single-phase transformer having a plurality of main terminals, a dynamo-electric machine having a polyphase primary winding and a secondary winding, conductors connecting said translating device, transformer and machine in series, whereby a portion of said transformer is included in each complete circuit between said balanced device and said machine and whereby the electromotive force in one of the primary phase windings is substantially in quarter-phase relation to the electromotive forces in said transformer, said secondary winding rotating in such direction that the terminal electromotive forces generated in said machine have a phase-sequence opposite to that of said balanced device, an auxiliary winding on said transformer, an auxiliary synchronous polyphase machine energized from said auxiliary winding and from said quarter-phase related winding, the relatve voltages of said energizing windings with respect to said auxiliary machine being such that substantially all of the watt-currents drawn by said auxiliary machine are supplied by said auxiliary winding, and means for exciting said series machine in such manner that the resultant wattless currents supplied to said balanced device are substantially balanced and in the same phase-sequence as the terminal electromotive forces of said device.

In testimony whereof, I have hereunto subscribed my name this 27th day of December, 1920.

RUDOLF E. HELLMUND.